United States Patent [19]

Lowe et al.

[11] 3,879,214

[45] Apr. 22, 1975

[54] ROADSTONE

[75] Inventors: Edward James Lowe, Stourton near Stourbridge; Arthur Wilson, Stourbridge; Stephen Lubetkin, Birmingham, all of England

[73] Assignee: Albright and Wilson Limited, Birmingham, England

[22] Filed: Apr. 19, 1973

[21] Appl. No.: 352,635

Related U.S. Application Data

[63] Continuation of Ser. No. 93,456, Nov. 27, 1970, abandoned.

[30] Foreign Application Priority Data

Nov. 28, 1969 United Kingdom.............. 58321/69
Apr. 20, 1970 United Kingdom.............. 18797/70

[52] U.S. Cl............. 106/288 B; 106/117; 106/309; 106/65
[51] Int. Cl............................................ C08h 17/04
[58] Field of Search........ 106/40 R, 65, 117, 288 B, 106/309

[56] References Cited
UNITED STATES PATENTS

| | | | |
|---|---|---|---|
| 2,017,889 | 10/1935 | Bowyer............................ | 106/40 V |
| 2,977,239 | 3/1961 | Parsons............................ | 106/117 |
| 3,215,542 | 11/1965 | Tinker.............................. | 106/117 |

*Primary Examiner*—J. Poer
*Assistant Examiner*—J. V. Howard
*Attorney, Agent, or Firm*—Herbert H. Goodman

[57] ABSTRACT

It is known to sinter minerals to form granular roadstone. The invention proposes sintering certain powdered industrial by-products in the absence of combustible solids. The invention has the advantage of providing a cheap roadstone of improved crushing strength.

20 Claims, No Drawings

ROADSTONE

This is a continuation of application Ser. No. 93,456, filed Nov. 27, 1970, now abandoned.

The present invention relates to roadstone. A variety of mineral aggregates have been used or proposed for use in the construction of road surfaces, usually in conjunction with bitumen or cement. A disadvantage of many of the materials hitherto proposed is that they tend to wear smooth after a period of use, giving a polished surface which affords little grip to the tyres of passing traffic. Other materials have the disadvantage of being highly porous, which results in a low crushing strength.

We have now discovered a method for the manufacture of roadstone having a high resistance to polishing (measured as the polished stone value or P.S.V.) and to compositions which combine a high P.S.V. with a high crushing strength.

Our invention provides a method for the manufacture of roadstone which consists in heating a red mud or powdered, siliceous, refractory, industrial by-product, in the absence of combustible solids, to a sintering temperature above 1,000°C but below the melting point of at least the majority of the powder and, if necessary, crushing the sinter, to form a granular sintered product. The term "road mud" as used herein refers to the residue from alkaline extraction of bauxite in aluminium manufacture. A typical red mud has the composition: $Al_2O_3$ 16%, $Fe_2O_3$ 53%, $TiO_2$ 8%, $SiO_2$ 6%, $Na_2O$ 5%, $CaO$ 3%.

The siliceous, refractory industrial by-product may be crushed rock such as quarry or other rock fines, a powdered slag such as blast furnace slag, copper slag, phosphorus furnace slag or cupola slag, silt or other aluvial mud obtained from dredging operations or pulverised fuel ash, such as the by-product from coal fired power stations. As used herein "siliceous" refers to a by-product containign at least 30% $SiO_2$.

The red mud or powdered, siliceous, refractory material desirably has a particle size less than 1 mm, preferably less than 50 mesh BSS, e.g., 400 to 50 mesh BSS. Preferably the product is graded (after crushing, if necessary) to provide granules of from ⅛ inch to 1 inch in size, e.g., ½ inch.

The powdered material may advantageously comprise a mixture of two or more siliceous by-products. For example mixtures of slag and fuel ash, red mud and fuel ash or quarry fines and silt may be employed. It is also possible to add other particulate minerals such as crushed bauxite, or spinels such as chrome residue, as taught in our opening application British Pat. No. 58319/69.

The mixture may contain a flux such as calcium fluoride or soda glass, to facilitate sintering. Many industrial by-products are however, self-fluxing due to the presence of impurities, and most are capable of being sintered farily readily without any added flux.

The term "sintering" describes the aggregation of particles on heating below their melting point, whereby each particle becomes joined physically to those which it is in contact and loses its separate identity, while at least the majority of the material remains in the solid state.

The red mud or powdered, siliceous, refractory material is calcined substantially in the absence of combustible material. By the expression "substantially in the absence of combustible material" we mean that the proportion of carbonaceous or other combustible material is insufficient to maintain self-sustaining combustion of the mixture. We have found that the presence of combustible material in the calcined mixture causes evolution of gases, which results in an undesirably porous product of lowered crushing strength. We therefore rely on sources of heating external to the mixture in order to effect sintering. By this means we obtain a product of higher crushing strength and good P.S.V.

The red mud or powdered, siliceous by-product may be heated directly, e.g. forming it into a bed on a moving grate. Preferably, however, the by-product is first slurried or moistened with water.

The amount of water mixed with the powder may be sufficient to form a pumpable slurry or merely sufficient to moisten the powder and provide a stiff pasty or plastic material. Some by-products such as aluvial silt may sometimes be obtained in a sufficiently moist state for addition of further water to be unnecessary.

The slurry may be calcined directly, for example in a rotary kiln. Alternatively the moistened powder may first be formed into pellets by extrusion, compaction or moist granulation prior to calcination. The pellets may conveniently be formed in the presence of a binder such as aqueous sodium silicate and may be dried in a preliminary clacination prior to sintering. A further method of performing the sintering is to form the moistened powder into bricks, by compacting in a die, and firing the bricks, for example in a tunnel kiln.

If the composition is formed into bricks it is preferred to employ a die having a rough surface. It is further preferred to form the bricks in dies which impress a system of grooves or other constrictions, whereby each brick is divided into a plurality of tablets joined together by relatively narrow necks of material, thus facilitating the breaking of the bricks into appropriately sized pieces on subsequent crushing.

Each of the three preferred methods of sintering, i.e., heating a slurry in a rotary kiln, pelletising the charge prior to sintering and bricking, has its own particular advantages. Slurrying is a particularly cheap and convenient way of obtaining the sinter, but gives less control over the size of the product granules. pelletisation gives a better control of the granule size. Bricking is the most expensive method, but gives the best possibility of controlling granule size and also enables a rough surface to be superimposed on the granules by use of a suitable die.

The powder, slurry, pellets or bricks are calcined by external heating, i.e., they are exposed to hot gases at temperatures and for times sufficient to effect sintering thereof, in directly or indirectly fired kilns.

We have further discovered that a particularly satisfactory roadstone can be produced by sintering a pelletised ground slag, especially by sintering pellets of ground slag mixed with a relatively hard particulate refractory material.

According to a further embodiment, our invention provides a method for production of roadstone which comprises pelletising a powdered slag and sintering the pellets.

"Slag" as used herein, means a calcareous or siliceous material obtained as a molten by-product of metallugical processes or of the heating of ores. It includes blast furnace slag, phosphorus furnace slag, cupola slags and copper slag. The term also includes falling slags, although those are less preferred. The preferred slag is phosphorus furnace slag.

According to this embodiment of our invention the slag is first ground sufficiently finely to permit pelletisation. Typically the slag is ground to less than 1 mm, preferably less than 50 mesh BSS. The ground slag may be pelletised by a variety of known techniques. Preferably the powder is made into a paste with water and the past granulated or extruded and dried to form pellets. Binders for the pellets may be employed, e.g., sodium silicate. Typically the pellets are from ⅛ inch to 1 inch in diameter, e.g. ½ inch.

The pellets may optionally contain an added flux such as $CaF_2$, but this is not usually necessary since the slags are generally self fluxing.

It is possible to incorporate a carbonaceous fuel into the pellets which will add sintering by its combustion, but we prefer to avoid such additions and to relay on the heat of the kiln to effect sintering.

The pellets are calcined, for example in a rotary kiln, at a temperature sufficient to produce a hard sinter. Typically temperatures of from 1,000° to 1,400°C are employed; preferably 1,100° to 1,300°C, e.g., 1,200°C.

We have discovered that with some slags it is possible to produce roadstone in a range of desirable colours, by controlling conditions of firing. For example phosphorus furnace slag can provide roadstone ranging from yellow to dark brown, the darker colours being obtained by longer firing or higher temperatures.

According to a preferred embodiment our invention provides a sintered pelletised slag, having a relatively hard, particulate, refractory material incorporated into the pellets thereof.

The particulate refractory material may be any substance which is harder than the sintered slag, and which does not fuse completely at the sintering temperature. Preferably the material is one which undergoes limited reaction with the slag on calcination so that the hard particles are chemically bonded into a softer matrix of slag. Typical particulate refractory materials include sand, calcine bauxite, crushed refractory brick, and the residue from the chemical extraction of chromium from chrome ore. The last mentioned material is especially preferred.

The hard refractory particles should be of a suitable size for pelletisation in conjunction with the powdered slag. The particles may be less than 1 mm, preferably in the range of 400 to 50 mesh BSS, e.g., 300 to 100 mesh.

The hard refractory particles are preferably mixed with the powdered slag in a proportion of from 40 to 90% by weight of the mixture, preferably 60 to 80%, e.g., 75%.

The hard refractory particles may be mixed with the powdered slag before pelletisation. The product may be pelletised, calcined and used substantially as hereinbefore described with reference to the slag alone.

We have found that the structure of our preferred embodiment, consisting of hard particles embedded in a softer matrix, is particularly well suited to road surfacing, since it has less tendency to become smooth on wearing than have conventional roadstones.

The product according to any embodiment of our invention may be crushed and graded and used as a surfacing for roads. Preferably the stones are mixed with bitumen, cement or a resin binder to form a compact road surface.

The invention is illustrated by the following examples:

EXAMPLES

1. A mixture of 25% phosphorus furnace slag −170 mesh and 75% copper slag −52 +100 mesh was pelletised and fired for 2 hours at 1,040°–1080°C. The product gave a P.S.V. of 74.

2. Red mud was pelletised and fired at 1,250°C for 1 hour. The product gave a P.S.V. of 62.

3. Copper slag −100 mesh was pelletised and fired at 1,175°C for 1 hour. The product has a P.S.V. of 78.

4. A mixture of 25% phosphorus slag −170 mesh and 75% copper slag −100 mesh was fired at 1,050°C for 2 hours. The product had a P.S.V. of 68 and an aggregate abrasion value of 3.4.

5. Phosphorus furnace slag was crushed to −100 mesh, mixed into a paste with water and formed into ½ inch pellets. The pellets were calcined at 1,150°C. The product had a P.S.V. of 66. This compared with a P.S.V. of 45 for an unsintered slag crushed to ½ inch granules.

6. Chrome residue of −200 mesh was mixed with ⅓ of its weight of phosphorus furnace slag ground to 100 mesh. The mixture was formed into ½ inch pellets, and fired at 1,200°–1,250°C. The product had a P.S.V. of 87.

We claim:

1. A method for the manufacture of sintered slag roadstone which consists in heating ground slag having a particle size less than 1 mm in the absence of combustible solids to a sintering temperature above 1,000°C but below the melting point of at least the majority of the ground slag the heat being supplied entirely from sources external to the ground slag to form a sinter product and then crushing said sinter product to form a granular product having a diameter from ⅛ inch to 1 inch.

2. A method for the manufacture of sintered slag roadstone comprising pelletising ground slag having a particle size less than 1 mm; sintering said pellets in the absence of combustible solids at a temperature above 1,000°C but below the melting point of at least the majority of the ground slag comprising said pellets, the heat being supplied entirely from sources external to said pellets, thereby forming a sinter product having a diameter from ⅛ inch to 1 inch.

3. The method of claim 2 wherein said ground slag is mixed with from 40% to 90% by weight of a harder refractory material having a particle size less than 1 mm and selected from the group consisting of silica sand, calcine bauxite, crushed refractory brick, and chrome residue.

4. The method of claim 3 wherein said slag is phosphorus furnace slag.

5. The method of claim 2 wherein said slag is phosphorus furnace slag.

6. The method of claim 5 wherein said ground slag has particle size less than 50 mesh BSS.

7. A method for the manufacture of sintered slag roadstone comprising forming a powdered ground slag into bricks, said ground slag having a particle size less than 1 mm; sintering said bricks in the absence of combustible solids to a temperature above 1,000°C but below the melting point of at least the majority of the powder comprising said bricks, the heating being supplied entirely from sources external to said bricks, thereby forming a non-cellular sinter product.

8. The method of claim 7 wherein each brick has impressed thereon a plurality of grooves whereby the brick after sintering is subdivided into tablets having a mean dimension of ⅛ inch to 1 inch.

9. The method of claim 8 wherein said slag is mixed with from 40% to 90% by weight of a harder refractory material having a particle size less than 1 mm and selected from the group consisting of silica sand, calcine bauxite, crushed refractory brick, and chrome residue.

10. The method of claim 9 wherein said slag is phosphorus furnace slag.

11. The method of claim 10 wherein said powdered ground slag has a particle size less than 50 mesh BSS.

12. The method of claim 8 wherein said slag is phosphorus furnace slag.

13. A method for the manufacture of roadstone comprising forming a slurry by admixing ground slag having a particle size less than 1 mm with water, forming said slurry into pellets having a dimension of from ⅛ inch to 1 inch and drying said pellets, and sintering said pellets in the absence of combustible solids at a sintering temperature above 1,000°C but below the melting point of at least the majority of the powder slag, the heat being supplied entirely from sources external to said pellets, thereby forming a non-cellular pellet having a diameter from ⅛ inch to 1 inch.

14. The method of claim 13 wherein said slag is mixed with from 40% to 90% by weight of a harder refractory material having a particle size less than 1 mm and selected from the group consisting of silica sand, calcine bauxite, crushed refractory brick and chrome residue.

15. The method of claim 14 wherein said slag is phosphorus furnace slag.

16. The method of claim 15 wherein said ground slag has a particle size less than 50 mesh BSS.

17. The method of claim 13 wherein said slag is phosphorus furnace slag.

18. A roadstone having a high resistance to polishing and a high crushing strength produced by the process of claim 2.

19. A roadstone having a high resistance to polishing and a high crushing strength produced by the process of claim 8.

20. A roadstone having a high resistance to polishing and a high crushing strength produced by the process of claim 13.

* * * * *